May 13, 1941.   R. W. WAGNER   2,241,495
GEARING FOR MOWING MACHINES
Original Filed Jan. 3, 1938   3 Sheets-Sheet 1
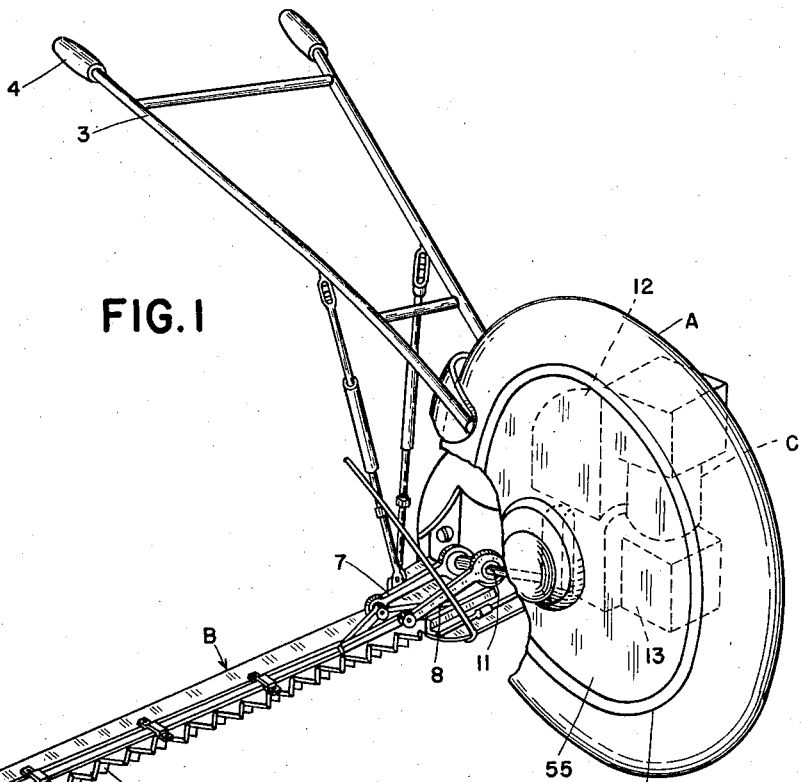
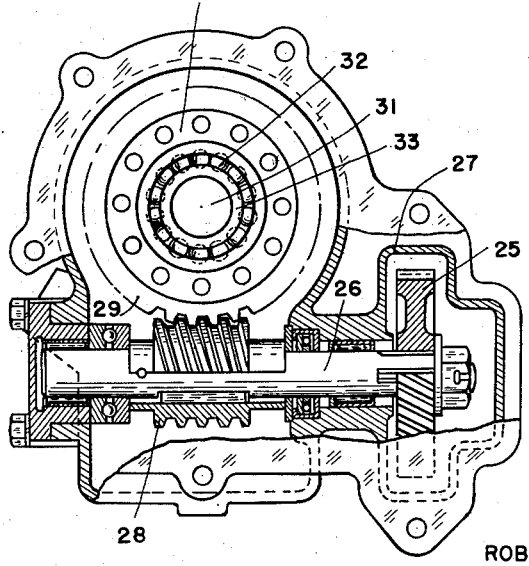
INVENTOR
ROBERT W. WAGNER

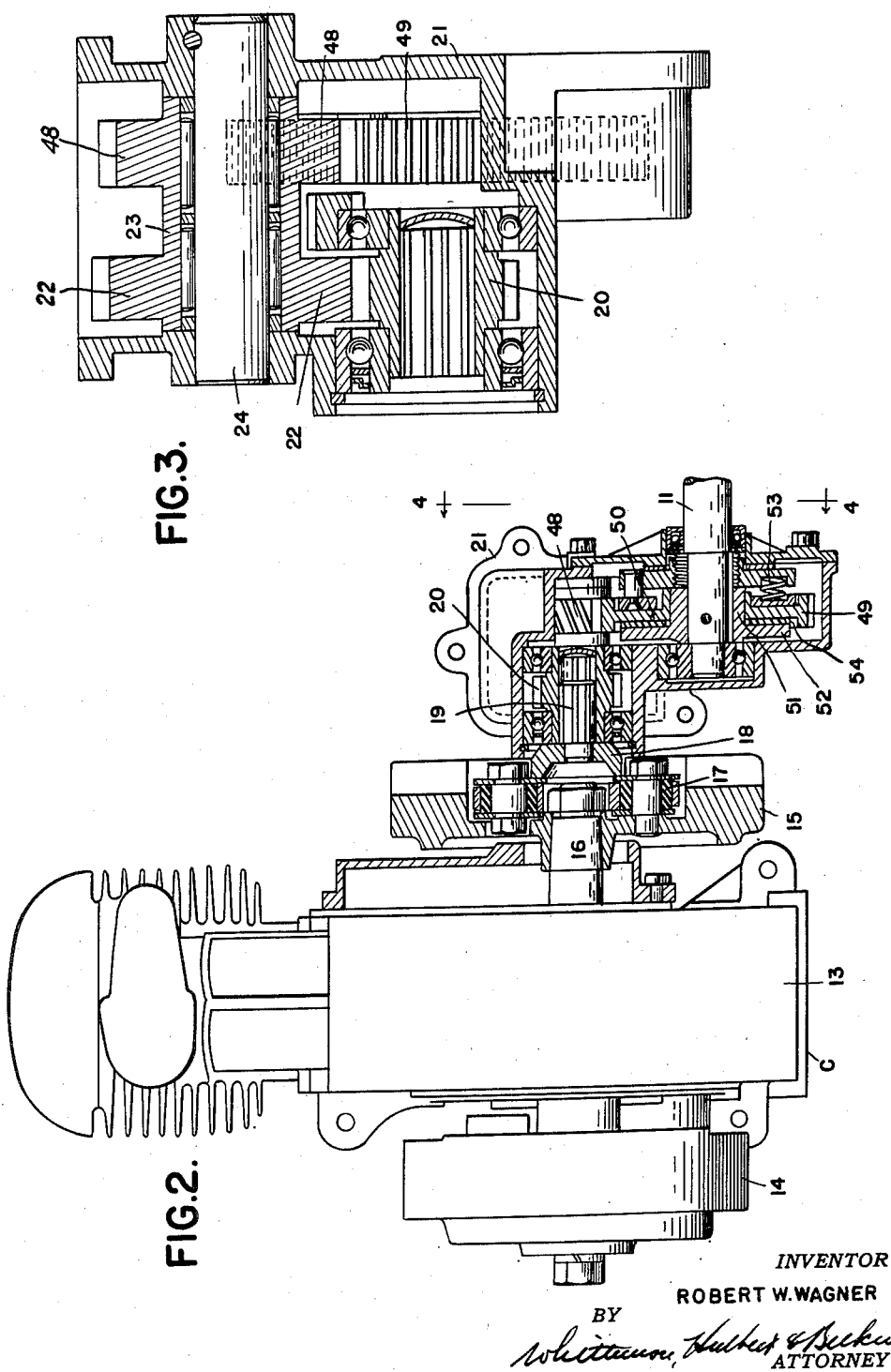

May 13, 1941.    R. W. WAGNER    2,241,495
GEARING FOR MOWING MACHINES
Original Filed Jan. 3, 1938    3 Sheets-Sheet 3

INVENTOR
ROBERT W. WAGNER
BY
ATTORNEYS

Patented May 13, 1941

2,241,495

UNITED STATES PATENT OFFICE 2,241,495

GEARING FOR MOWING MACHINES

Robert W. Wagner, Detroit, Mich., assignor to Detroit Harvester Company, Detroit, Mich., a corporation of Michigan Original application January 3, 1938, Serial No. 183,176. Divided and this application June 13, 1938, Serial No. 213,477

4 Claims. (Cl. 74—11)

This invention relates generally to mowing machines, especially those wherein the mowing mechanism and power plant are carried by a single ground wheel and constitutes a division of my application filed January 3, 1938, bearing Serial No. 183,176.

One of the essential objects of the invention is to provide improved means for driving the mowing mechanism and ground wheel from the power plant.

Another object is to provide means of this type that operates constantly while the power plant is in operation to drive the mowing mechanism and that may at will be used to operate the ground wheel.

Other objects, advantages and novel details of construction of this invention will be made more apparent as this description proceeds, especially when considered in connection with the accompanying drawings, wherein:

Figure 1 is a perspective view of a mowing machine embodying my invention;

Figure 2 is a fragmentary side elevation of the machine with parts broken away and in section;

Figure 3 is a horizontal sectional view taken on line 3—3 of Figure 4;

Figure 6 is a sectional view taken substantially on line 6—6 of Figure 5;

Figure 4:
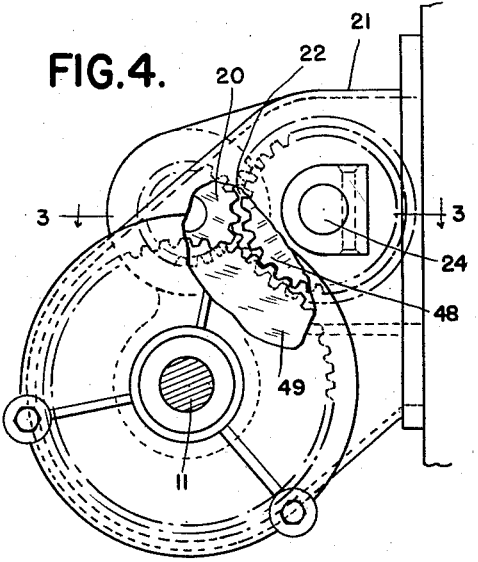
Figure 4 is a sectional view on line 4—4 of Figure 2 with parts broken away.
Figure 5:
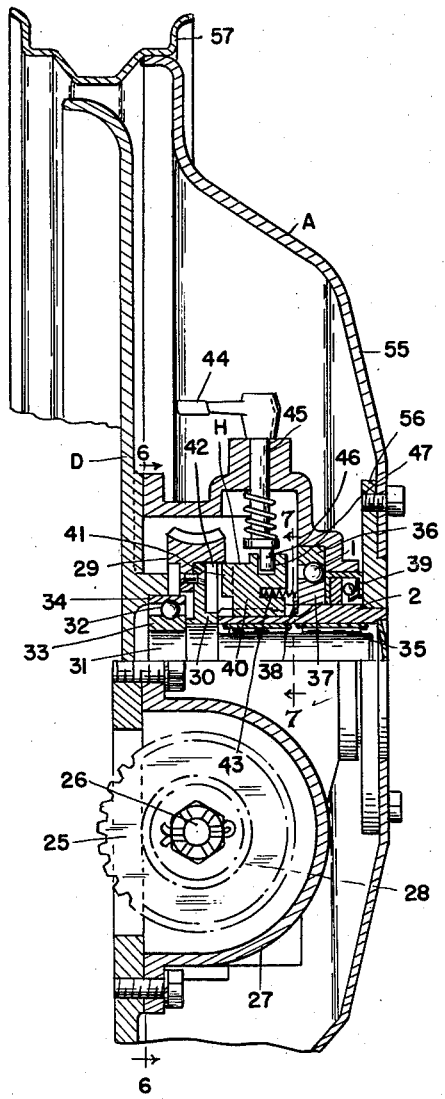
Figure 5 is a fragmentary vertical sectional view through the housing formed by the ground wheel and frame and showing the clutch mechanism and associated parts.
Figure 7:
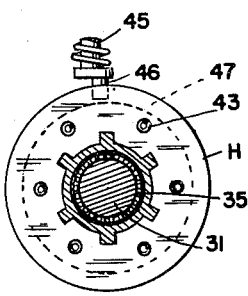
Figure 7 is a sectional view taken on line 7—7 of Figure 5.

Referring now to the drawings, A is the ground wheel, B is the mowing mechanism, and C is the power plant for both the wheel A and mowing mechanism B of a machine embodying my invention.

D is a frame carrying bearings 1 for the hub 2 of the ground wheel and serving as a common support for the mowing mechanism B and power plant C. To facilitate guiding the machine, the frame D is provided with handlebars 3 that extend rearward therefrom and have suitable grips or handles 4 at their rear ends.

The mowing mechanism B preferably comprises a pair of cooperating cutter bars 5 and 6 operable by pitman rods 7 and 8 from suitable cams 9 and 10 on a shaft 11 driven by the power plant C, as in my copending application filed January 3, 1938, bearing Serial No. 183,175.

The power plant C is bolted to the frame D and preferably comprises an internal combustion engine which is fed with gasoline from a tank 12 constituting a part of the frame D. As shown, the engine C is conventional in design and has a suitable crank case 13, magneto 14, and flywheel 15. Preferably the flywheel 15 is fixed to the engine drive shaft 16 and carries a resilient mounting 17 for a spider 18 carrying an axial extension 19 of the shaft 16.

20 is a gear journaled in suitable bearings in a housing 21 on the frame D and splined upon the extension 19 of the engine drive shaft. 22 is a gear meshing with gear 20 and having a hub 23 journaled on a stub shaft 24 in the housing 21.

For driving the ground wheel A, I have provided a gear 25 that meshes with gear 22 and is splined upon shaft 26 journaled in another housing 27 carried by the frame D. Fixed upon this shaft 26 is a worm 28 meshing with a gear 29 having a hub 30 on a shaft 31 extending axially of the hub 2 of the ground wheel. Ball bearings 32 are provided between races 33 and 34 respectively carried by the shaft 31 and housing 27, while needle bearings 35 are provided between the shaft 31 and wheel hub 2. The bearings 1 for the wheel hub 2 are similar to the ball bearings 32 and are disposed between races 36 and 37 respectively carried by the hub 2 and housing 27. 38 is a lock ring for the wheel hub 2, and 39 is an oil seal for the wheel hub.

For driving the wheel A from the gear 29, I have provided a clutch H comprising a collar 40 splined upon the wheel hub 2 and having laterally projecting teeth 41 for clutching engagement with suitable recesses 42 in the adjacent side of the gear hub 30. Coil springs 43 tend to move the collar 40 into clutching engagement with the gear 29, while a throw-out lever 44 is used to disengage the parts. As shown, this lever 44 has a pivot 45 journaled in the housing 21 and provided at its lower end with an eccentric pin 46 that engages a circumferentially extending groove or channel 47 in the collar 40.

For driving the mower mechanism B, I have provided a gear 48 integral with the hub 23 of the gear 22 and meshing with a gear 49 connected by a friction clutch 50 to the pitman cam carrying shaft 11. As shown, gear 49 is sleeved on the hub 51 of a disc 52 fixed to shaft 11 and is held by coil springs 53 against a clutch lining 54 on the adjacent face of the disc 52.

Thus, with the construction as described, the drive from the power plant C to the cutter bars 5 and 6 of the mowing mechanism B is constant while the engine is running. Normally, the clutch teeth 41 of the collar 40 are out of engagement with the recesses 42 in the gear hub 30, hence the gear 42 and shaft 31 revolve freely without actuating the ground wheel A. However, when it is desired to drive the machine over the ground, the lever 44 is actuated so as to permit the clutch teeth 41 to engage the recesses 42 and thus establish a driving connection between the gear 29 and ground wheel A. The wheel hub 2, shaft 31, collar 40 and gear 29 will then turn in unison.

What I claim as my invention is:

1. A driving mechanism of the class described comprising a shaft, a gear on said shaft and having a laterally extending hub portion, a driving gear meshing with the gear aforesaid, another gear meshing with and adapted to be rotated by the first mentioned gear, a shaft for the last mentioned gear, a worm on the last mentioned shaft, a gear meshing with said worm, means operable by the fourth mentioned gear for driving a ground wheel, a gear fixed to the laterally extending hub portion of the first mentioned gear, a gear meshing with the fifth mentioned gear, and means operable by the sixth mentioned gear for driving a cutter bar.

2. A driving mechanism of the class described comprising a drive shaft, a gear nonrotatively mounted on said drive shaft, a stub shaft adjacent the drive shaft, a gear on said stub shaft meshing with and driven by the first mentioned gear, a gear meshing with and adapted to be driven by the second mentioned gear, a shaft for the last mentioned gear, a worm on the last mentioned shaft, a gear meshing with said worm, means operable by the fourth mentioned gear for driving a ground wheel, the second mentioned gear having a laterally extending hub portion, a gear fixed to said hub portion, and a power take-off mechanism including a gear meshing with the fifth mentioned gear.

3. A driving mechanism of the class described comprising a drive gear, a gear meshing with and driven by the drive gear, a gear meshing with and adapted to be driven by the second mentioned gear, a shaft for the last mentioned gear, a worm on said shaft, a gear meshing with said worm, means operable by the fourth mentioned gear for driving a ground wheel, the second mentioned gear having a laterally extending hub portion, a gear carried by said hub portion, and means operable to drive a cutter bar including a gear meshing with the fifth mentioned gear.

4. A driving mechanism of the class described comprising a shaft, a gear on said shaft and having a laterally extending hub portion, a driving gear meshing with the gear aforesaid, another gear meshing with and adapted to be rotated by the first mentioned gear, a shaft for the last mentioned gear, a worm on the last mentioned shaft, a gear meshing with said worm, means operable by the fourth mentioned gear for driving a ground wheel, a gear carried by the laterally extending hub portion of the first mentioned gear, and a power take-off mechanism including a gear meshing with the fifth mentioned gear.

ROBERT W. WAGNER.